(12) United States Patent
Yuan et al.

(10) Patent No.: US 9,632,940 B2
(45) Date of Patent: Apr. 25, 2017

(54) INTELLIGENCE CACHE AND INTELLIGENCE TERMINAL (75) Inventors: Cissy Yuan, Shenzhen (CN); Erkun Mao, Shenzhen (CN); Qian Chen, Shenzhen (CN); Jian Wang, Shenzhen (CN); Xuehong Tian, Shenzhen (CN); Daibing Zeng, Shenzhen (CN); Wanting Tian, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 165 days.

(21) Appl. No.: 14/375,720

(22) PCT Filed: Jun. 29, 2012

(86) PCT No.: PCT/CN2012/077953
§ 371 (c)(1),
(2), (4) Date: Jul. 31, 2014

(87) PCT Pub. No.: WO2013/113206
PCT Pub. Date: Aug. 8, 2013

(65) Prior Publication Data
US 2015/0309937 A1 Oct. 29, 2015

(30) Foreign Application Priority Data
Feb. 1, 2012 (CN) .......................... 2012 1 0022513

(51) Int. Cl.
*G06F 12/00* (2006.01)
*G06F 12/0864* (2016.01)
(Continued)

(52) U.S. Cl.
CPC ...... *G06F 12/0864* (2013.01); *G06F 12/0831* (2013.01); *G06F 12/0862* (2013.01);
(Continued)

(58) Field of Classification Search
None
See application file for complete search history.

(56) References Cited

U.S. PATENT DOCUMENTS 5,367,653 A  11/1994  Coyle
6,334,177 B1  12/2001  Baumgartner
(Continued)

FOREIGN PATENT DOCUMENTS

CN  1746865 A  3/2006
CN  1783034 A  6/2006
(Continued)

OTHER PUBLICATIONS

International Search Report in international application No. PCT/CN2012/077953, mailed on Nov. 15, 2012. (2 pages—see entire document).
(Continued)

*Primary Examiner* — Midys Rojas
(74) *Attorney, Agent, or Firm* — Oppedahl Patent Law Firm LLC (57) ABSTRACT The disclosure discloses an intelligence cache and an intelligence terminal, wherein the intelligence cache comprises: a general interface, configured to receive configuration information and/or control information, and/or data information from a core a bus, and return target data; a software define and reconfiguration unit configured to define a memory as a required cache memory according to the configuration information; a control unit, configured to control writing and reading of the cache memory and monitor instructions and data streams in real time; a memory unit, composed of a number of memory modules and configured to cache data; the required cache memory is formed by memory modules according to the definition of the software define and reconfiguration unit; and an intelligence processing unit, configured to process input and output data
(Continued)

and transfer, convert and operate on data among multiple structures defined in the control unit. The disclosure can realize an efficient memory system according to the operating status of software, the features of tasks to be executed and the features of data structures through the flexible organization and management by the control unit and the close cooperation of the intelligence processing unit.

19 Claims, 7 Drawing Sheets (51) Int. Cl.
    *G06F 12/0893* (2016.01)
    *G06F 12/0862* (2016.01)
    *G06F 12/0831* (2016.01)
    *G06F 17/30* (2006.01)

(52) U.S. Cl.
    CPC .... *G06F 12/0893* (2013.01); *G06F 17/30982* (2013.01); *G06F 2212/1012* (2013.01); *G06F 2212/601* (2013.01); *G06F 2212/6032* (2013.04); *G06F 2212/621* (2013.01)

(56) References Cited

U.S. PATENT DOCUMENTS

| | | |
|---|---|---|
| 6,347,346 B1 | 2/2002 | Taylor |
| 6,678,790 B1 | 1/2004 | Kumar |
| 8,087,034 B2 | 12/2011 | Frank et al. |
| 2002/0038414 A1 | 3/2002 | Taylor |
| 2003/0084244 A1 | 5/2003 | Paulraj |
| 2004/0215893 A1 | 10/2004 | Emerson |
| 2005/0138264 A1 | 6/2005 | Goto |
| 2006/0075192 A1 | 4/2006 | Golden |
| 2006/0117143 A1 | 6/2006 | Emerson |
| 2008/0010408 A1 | 1/2008 | Shen |
| 2008/0263278 A1 | 10/2008 | Shen |
| 2010/0162028 A1 | 6/2010 | Frank et al. |
| 2011/0107032 A1 | 5/2011 | Shen |
| 2011/0145626 A2 | 6/2011 | Frank et al. |
| 2011/0296406 A1 | 12/2011 | Bhandari et al. |

FOREIGN PATENT DOCUMENTS

| | | |
|---|---|---|
| CN | 101814039 A | 8/2010 |
| CN | 102289390 A | 12/2011 |
| EP | 0549508 A1 | 6/1993 |
| EP | 1045307 A2 | 10/2000 |
| WO | 03038626 A2 | 5/2003 |

OTHER PUBLICATIONS

English Translation of the Written Opinion of the International Search Authority in international application No. PCT/CN2012/077953, mailed on Nov. 15, 2012. (5 pages—see entire document).

Supplementary European Search Report in European application No. 12867234.2, mailed on Aug. 18, 2015.

INTELLIGENCE CACHE AND INTELLIGENCE TERMINAL

TECHNICAL FIELD

The disclosure relates to the technology of intelligence cache, in particular to a flexible and configurable intelligence cache defined by software by the method of closely combining software and hardware, and an intelligence terminal having the intelligence cache.

BACKGROUND

By using a time or space locality of a processor executing programs, a traditional cache memory temporarily stores the latest and/or frequently executed instructions and data in the cache memory close to a processor unit. When it is required to access a certain instruction or data, the cache memory will be accessed first, and then a next-level memory of low speed and large memory space will be accessed if the cache memory is missing.

Figure 1:
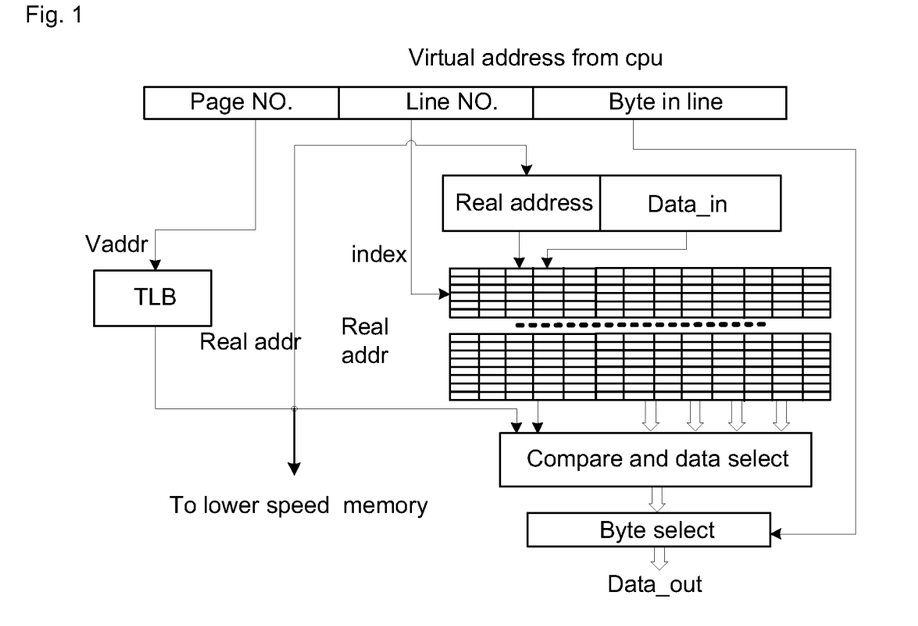
FIG. 1 shows a typical cache structure.

FIG. 1 shows a typical cache structure. As shown in FIG. 1, since instructions and data loaded into a cache are updated in real time according to dynamic executions of programs, the processor core will first search a tag matrix in the cache to confirm whether the required instructions or data are in the cache. Once cache miss, the tag search and data comparisons are invalid, and then the next-level memory will be accessed, which results in a waste of a plurality of execution cycles of the processor and a waste of the power consumption of the cache. To increase the hit rate of the cache, a multilevel cache structure for example of set association, complex replacement operation, perfecting, predicting read and hierarchy are used. Of course, such performance improvements are dependent entirely on increasing hardware complexity and chip area overhead. Since the cache structure shown in FIG. 1 is a well known cache, the functions and principles of respective parts will not explained in detail here.

Another disadvantage of cache is that access delays for hit and miss are completely different, it is difficult to predict the delays for accessing the cache, and Tightly Coupled Memory (TCM) is introduced in many occasions. TCM is a Static Random Access Memory (SRAM) close to the core of a processor, and characterized in its high speed and fixed delay. The contents of TCM cannot be replaced in real time, and the TCM has a fixed and small capacity. Refreshing the TCM is dependent completely on software scheduling. Before refreshing the TCM, software will find out when to perform the refreshing and performing corresponding configuration operations, during which the TCM is inaccessible. Those factors limit the application of TCM.

Content Addressable Memory (CAM) is a dedicated memory. As a general module, it is incapable to make full use of its performance for some specific application scenarios. Further, comparing all the memory entries with input entries in parallel will lead to highly complicated and expensive hardware.

Therefore, it is difficult to improve performance by relying entirely on hardware complexity, power consumption or software intervention. Further, the fine granularity of processor execution and memory access (as per instructions), resources are fixedly categorized and divided, which is inefficient and wastes the memory resources of a system. With the close combination of software and hardware, it is possible to perform flexible and intelligence processing according to the program execution and features of data structure, the performance can be improved greatly and the performance, power consumption, cost and the like are more balanced.

SUMMARY

In view of this, the present disclosure provides an intelligence cache and an intelligence terminal, capable of being flexibly defined, configured and reconstructed by software according to specific applications, and solving the disadvantages such as high complexity, high overhead, high energy consumption and unpredictable delay of conventional caches as well as the problems of low efficiency of updating TCM data and low flexibility and narrow application area of memory units.

To achieve the objective above, the technical solution of the disclosure is implemented as follows:

An intelligence cache, including: a general interface, a software define and reconfiguration unit, a control unit, a memory unit and an intelligence processing unit, wherein, the general interface is configured to receive configuration information and/or control information and/or data information from a core or a bus and return target data;

the software define and reconfiguration unit is configured to define a memory as a required cache memory according to configuration information;

the control unit is configured to control writing and reading of the cache memory, monitor an instruction and a data stream in real time, and control the memory unit to load the required data in advance according to system information, features of tasks to be executed and features of data structures used;

the memory unit is composed of a number of memory modules and configured to cache data; and the required cache memory is formed by the memory modules according to the definition of the software define and reconfiguration unit; and the intelligence processing unit is configured to process input and output data and perform transfer, convert and operate on data among multiple structures defined in the control unit.

Preferably, the required cache memory can be configured to include at least one of the following memories:

TCM, CAM and Cache.

Preferably, the general interface further includes a coherent interface in the multi-core environment.

Preferably, the software define and reconfiguration unit is further configured to define cache memories with different properties and same structure, wherein the cache memories with different properties and same structure include at least one of the following: full associative cache, 16-way associative cache, 4-way associative cache, 2-way associative cache and direct-mapped cache.

Preferably, the software define and reconfiguration unit is further configured to dynamically reconstruct idle memory modules in the operating process.

Preferably, the intelligence processing unit transferring, converting and operating on data among multiple structures defined in the control unit includes:

matrix operation, bit level operation, data search, data sorting, data comparison, logic operation, setting/resetting, read-modify-write operations, and operations of increment, decrement, addition and subtraction.

Preferably, the intelligence processing unit is further configured to fill and update data and transfer data to a next-level memory.

Preferably, the control unit loads data according to the size of data blocks defined by the software define and reconfiguration unit or loads data automatically; and a dedicated memory area is defined in the memory unit to load abnormal or disordered control programs.

An intelligence terminal includes the intelligence cache above.

The intelligence terminal includes a computer, a notebook, a cell phone, a personal digital assistant or a game machine, for example.

The intelligence cache of the disclosure can process complex operations and disordered controls by a core only and submit a large amount of frequently used and simple data to the intelligence processing unit of the intelligence cache for processing. Furthermore, the data processing by the intelligence processing unit is not only related to individual data, but also to a whole specific data structure, so as to process data in proximity to memories as much as possible, thereby reducing the dependency on bus and the burden on core and achieving the balance among performance, power consumption, cost and the like. Due to close operation with software, even though there is no prefetching, predicting read and complex replacement algorithm, an efficient memory system can be realized according to the operating status of software, the features of tasks to be executed and the features of data structures through the flexible organization and management by the control unit and the close cooperation of the intelligence processing unit.

DETAILED DESCRIPTION

The disclosure provides an intelligence cache, including: a general interface, a software define and reconfiguration unit, a control unit, a memory unit and an intelligence processing unit, wherein the general interface is configured to receive configuration information and/or control information and/or data information from a core or a bus and return target data; the software define and reconfiguration unit is configured to define a memory as a required cache memory according to configuration information; the control unit is configured to control writing and reading of the cache memory, monitor an instruction and a data stream in real time, and control the memory unit to load the required data in advance according to system information, features of tasks to be executed and features of data structures used; the required memory system structure is responsible for the function of associative arrays such as Cache TAG of caching data and formed by a data cache memory unit according to the definition of the software define and reconfiguration unit; and the intelligence processing unit is configured to process input and output data and transfer, convert and operating on data among multiple structures defined in the control unit.

To highlight technical solutions and advantages of the disclosure, the disclosure is further explained below with reference to the embodiments and the accompanying drawings in detail.

Figure 2:
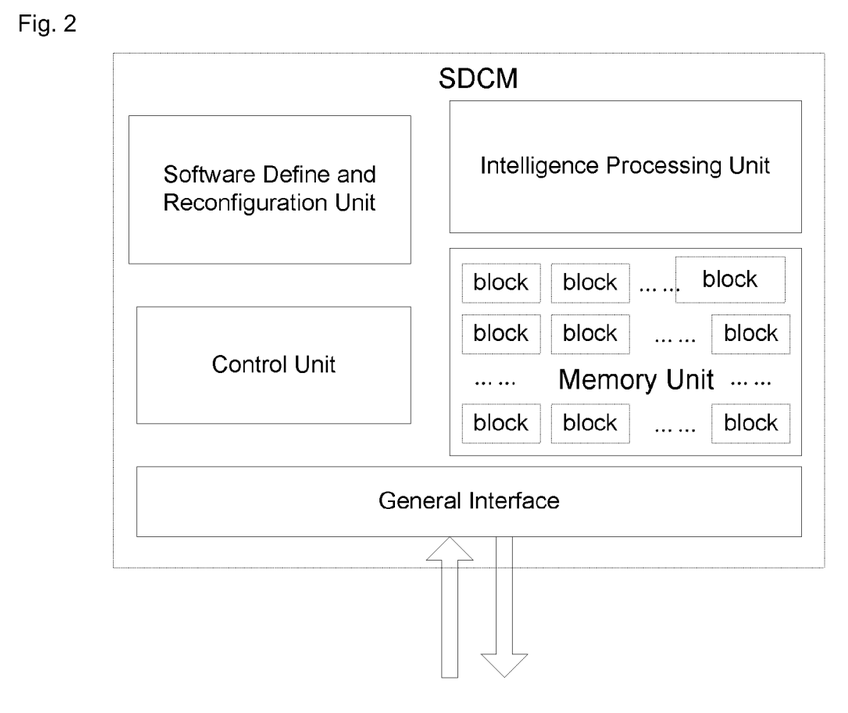
FIG. 2 shows a structural diagram of an intelligence cache according to one embodiment of the disclosure.

FIG. 2 shows a structural diagram of an intelligence cache according to one embodiment of the disclosure. It should be noted that the intelligence cache in the embodiment of the disclosure is also referred to as Software Define Cache Memory (SDCM); and in this application, SDCM represents the intelligence cache in the embodiment. As shown in FIG. 2, the intelligence cache of the disclosure mainly includes five processing units: a General Interface (GI), a Software Define and Reconfiguration Unit (SDRU), a Control Unit (CU), a Memory Unit (MU), and an Intelligence Processing Unit (IPU), wherein the GI is configured to receive configuration information and/or control information and/or data information from a core or a bus and return target data to the core or bus, and includes a data direct loading interface (for example, Direct Memory Access (DMA) interface) and a coherent interface in a multi-core environment. The SDRU is configured to define, according to configuration information, a memory of the SDCM as a required memory system structure, TCM, TCAM or Cache, for example, and define multiple cache memories of different properties and same structure, such as full associative cache, 4-way associative cache, 16-way associative cache, 2-way associative cache and direct-mapped cache, which can be simultaneously existent with other different types of memory structures such as TCM and TCAM. Idle memories can also be dynamically reconfigured in the operating process to make full use system memory resources; in addition to controlling reading and writing of a memory, the CU is further configured to monitor instructions and data streams in real time, and load the required data in advance according to system information, features of tasks to be executed and features of data structures used through close cooperation with the IPU to increase the hit rate in maximum; the MU is composed of a number of memory modules, and the functions of these modules can entirely be defined as required, and these modules can be configured to store indexes, tags, identifiers, data or other information, and combined freely to realize complex memory structures such as TCM, TCAM or Cache mentioned above. The IPU can process input and output data from SDCM, or transfer, convert and operate on data among several structures defined in the MU, such as matrix operation, bit level operation, data search, data sorting, data comparison, logic operation, setting/resetting, operations of reading, modification and writing, and operations of increment, decrement, addition and subtraction. The IPU can further cooperate with the CU to realize the data filling and update and data transfer to the next-level memory.

Based on the SDCM and requirements on software, the whole memory system can be defined as Cache, TCM, CAM or other memory structures, and the properties of these memory structures are configurable such as cache size, degree of association, row size, allocation policy and write-back approach; and the cache interface can be configured as a coherent interface to apply to a multi-core architecture; even, a Translation Lookaside Buffer (TLB) can be defined for the cache to realize the conversion of virtual and real addresses. The sizes of TCM and CAM can also be configured, and TCM and CAM can even be configured as a memory system structure with multiple cache structures and TCMs.

In the embodiments below, since the structure is relatively simple, the connections between respective functional units will not be explained, and those skilled in the art should understand that the respective processing units above can be connected by buses or dedicated interfaces.

Figure 3:
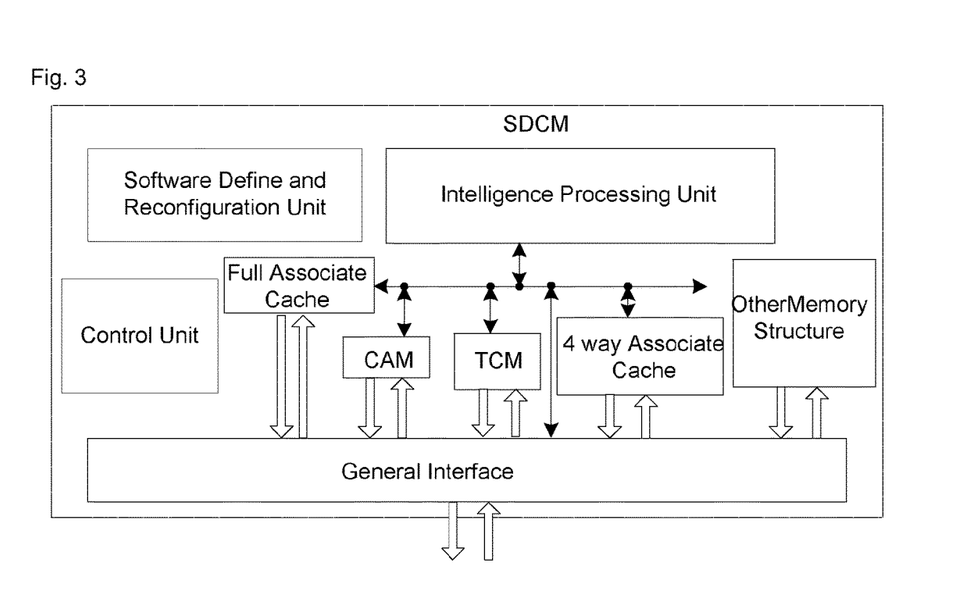
FIG. 3 shows a structural diagram of an intelligence cache according to first embodiment of the disclosure.

FIG. 3 shows a structural diagram of an intelligence cache according to first embodiment of the disclosure. As shown in FIG. 3, the SDCM defines full associative cache, 4-way associative cache, CAM, TCM and other memory structures. In the disclosure, all the data or indexes input or output by the memory structures defined by the SDCM can directly be processed in the MU by the IPU, such as conversion, bit insertion, bit lifting, set reset, displacement, bit reversal, and operations of increment, decrement, addition and subtraction, without submitting all the data processing tasks to the core, and data can flow among the memory structures in one MU to save the bandwidth of buses and reduce the burden of processors. The core is only responsible for complex operations and controls to improve the processing performance.

The technical solution of the disclosure can realize various required memory system structures, that is, the memory system structures can be defined freely as required, and several common implementations are shown below. In FIGS. 4 to 8, IF_CU represents all the units except for the memory and IPU of SDCM in the embodiments of the disclosure.

Figure 4:
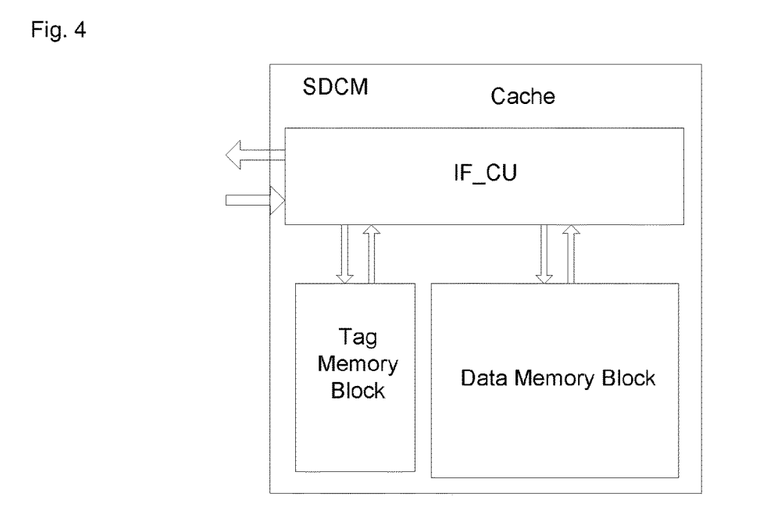
FIG. 4 shows a structural diagram of an intelligence cache according to second embodiment of the disclosure.

FIG. 4 shows a structural diagram of an intelligence cache according to a second embodiment of the disclosure. As shown in FIG. 4, the SDCM is defined as the cache structure shown in FIG. 4 by simple definition commands, and the defined cache can work as a normal cache under the combined control of CU. Of course, to reduce the processing complexity and closely cooperate with software, the defined cache will not use a complex replacement algorithm and methods such as prefetching and predicting read that improve performance. Instead, according to the information provided by software and features of tasks and data, the CU completes the organization and management of data, and finishes loading data from the next-level memory system and updating the next-level memory system. The granularity for loading data and update to the next-level are processed based on tasks, and the required data will not be replaced when tasks are in process. Those skilled in the art should understand that according to the intelligence cache structure provided by the disclosure, the cache configuration shown in FIG. 4 is easy to implement.

Figure 5:
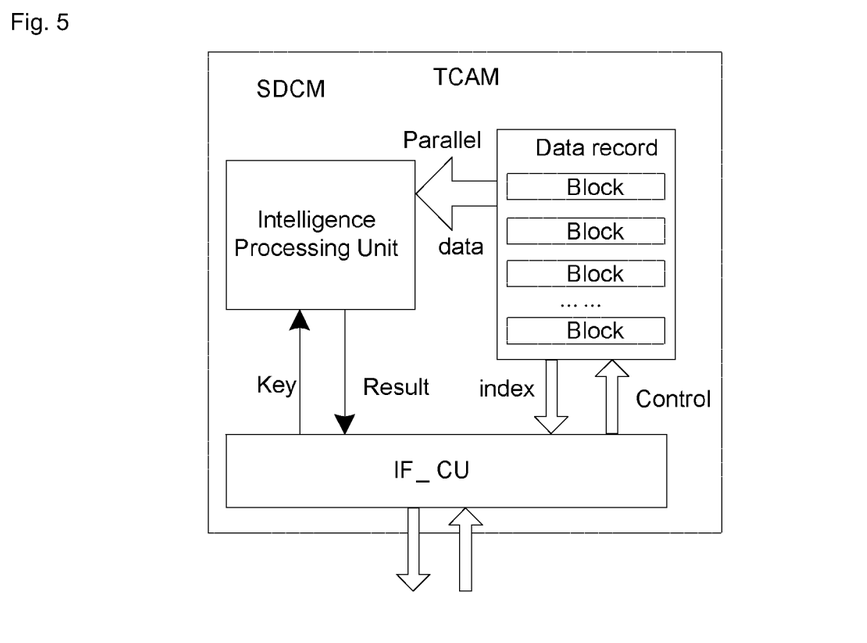
FIG. 5 shows a structural diagram of an intelligence cache according to third embodiment of the disclosure.

FIG. 5 shows a structural diagram of an intelligence cache according to a third embodiment of the disclosure. As shown in FIG. 5, when the SDCM is defined as TCAM, more memory blocks are required to read data records in parallel under the control of IF_CU, and the parallel data is compared with key words in the IPU which shows whether data is found successfully by outputting results. If so, IF_CU reads and outputs the corresponding index data in the memory blocks of the data records.

Figure 6:
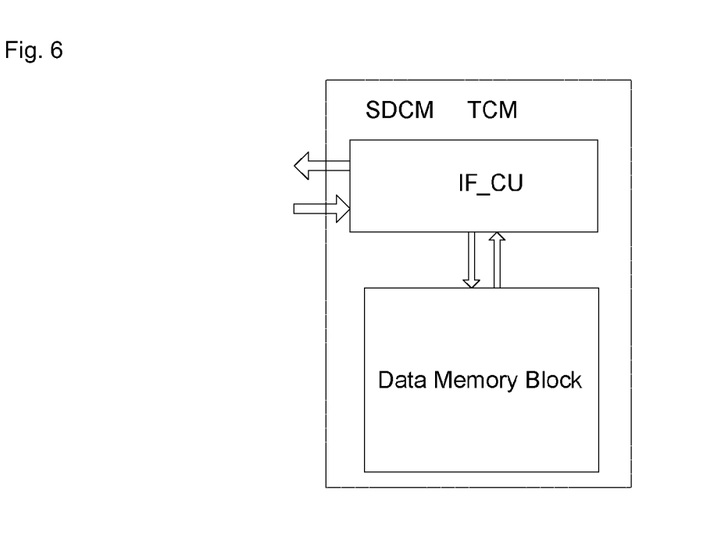
FIG. 6 shows a structural diagram of the composition of an intelligence cache according to fourth embodiment of the disclosure.

FIG. 6 shows a structural diagram of an intelligence cache according to a fourth embodiment of the disclosure. As shown in FIG. 6, when the SDCM is defined as TCM, the CU is only required to finish functions similar to simple reading and writing ram operations. The TCM needs only 1 memory block in minimum, and the minimum reading and writing cycle is 1 clock cycle. Of course, TCMs of different sizes can be obtained by combining different number of memory blocks.

In the disclosure, the SDCM can further be defined as a memory system with the capability of simple data processing, for example but not limited to bit operation, data search and matrix operation.

Under the control of IPU, it is more convenient to perform the operations such as preamble "0" or "1", and bit reversal (the bit switch of most significant bit and least significant bit, second most significant bit and second least significant bit and so on). It should be noted that the operations of data bits above are normal processing, so the implementation detail will not be explained here.

Figure 7:
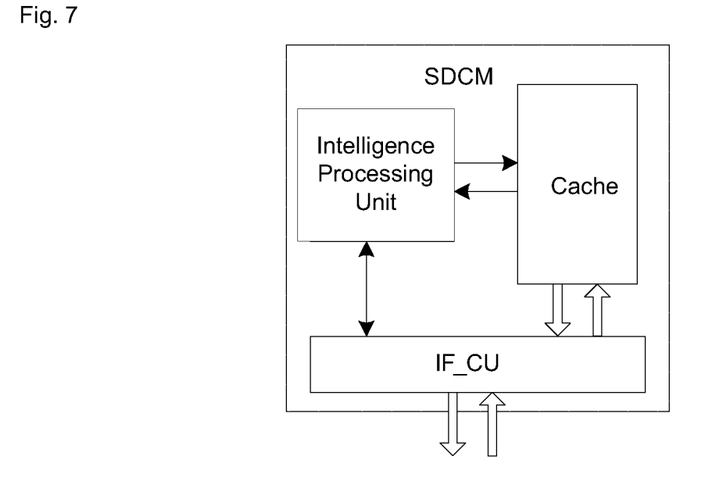
FIG. 7 shows a structural diagram of an intelligence cache according to fifth embodiment of the disclosure.

FIG. 7 shows a structural diagram of an intelligence cache according to a fifth embodiment of the disclosure, which is an example of the intelligence cache structure defined by the SDCM and capable of performing the bit operation. As shown in FIG. 7, the data to be processed is stored in the cache, and the SDCM can return the result to the core or still store the result in the cache as long as the core sends a command for reading the preamble "0" or "1" of data and bit operation. The way how the SDCM performs computation is transparent for the core.

The structure shown in FIG. 7 can also be used for realizing data search. As long as the core notifies the SDCM of the array to be searched for and data of interest, the IF_CU is responsible for reading data in the array of the cache and submitting the data to the IPU by a simple instruction of search task, and the IPU compares and determines whether the data is target data, and if so, returns to the address where the data is located through an interface. Such structure in the disclosure reduces the burden on processors and saves the bus bandwidth of processors, so that the processors can focus on the processing of other tasks.

Figure 8:
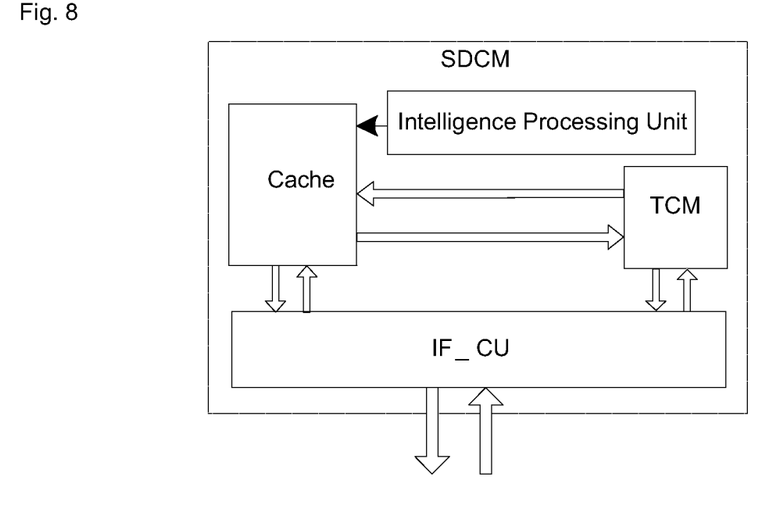
FIG. 8 shows a structural diagram of an intelligence cache according to sixth embodiment of the disclosure.

The SDCM can further perform data conversion on a large amount of data, such as matrix transposition. FIG. 8 shows a structural diagram of an intelligence cache according to a sixth embodiment of the disclosure, which is an example of the intelligence cache structure defined by the SDCM and capable of performing the matrix operation. As shown in FIG. 8, the SDCM can be defined as the structure shown in FIG. 8. During the matrix transposition, as long as the core gives the storage position information of the original matrix and the size of the matrix data block, and gives a command of starting computation, the SDCM can finish the transposition. The SDCM first reads column vectors of the original matrix from the cache into the TCM and writes the column vectors back to the cache as row vectors by IF_CU. Here, TCM is composed of multiple small blocks and written in a single block, while, under the control of IPU, it is able to realize the simultaneous reading of multiple blocks and perform bit extraction from the read data to realize the transposition. In addition, the offset computation of all addresses is finished by the IPU, and a transposed matrix of the original matrix is formed in the cache after all data in the column vectors is transferred. The processing time of such transposition is related to the matrix size, and software needs to know the delay of finishing the transposition.

Figure 9:
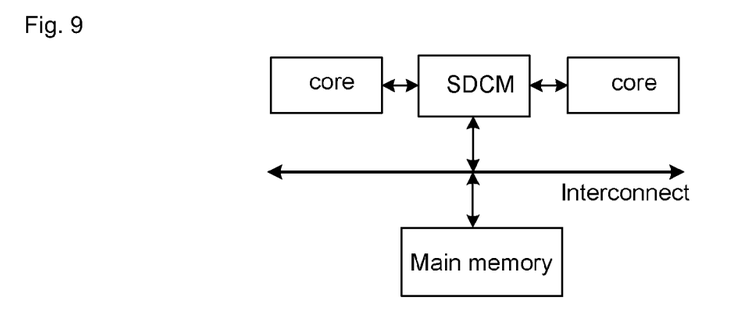
FIG. 9 shows a structural diagram of an intelligence cache according to seventh embodiment of the disclosure.

FIG. 9 shows a structural diagram of an intelligence cache according to a seventh embodiment of the disclosure, which is an example of the SDCM used as a shared memory. The SDCM is connected to an operating system though the GI, and the connection way can be standard bus or network on chip. The position of the SDCM in the system can be the shared memory system as shown in FIG. 9. In addition to the slave interface, the SDCM has the function of master interface, so it can launch the data transfer anytime and anywhere.

Figure 10:
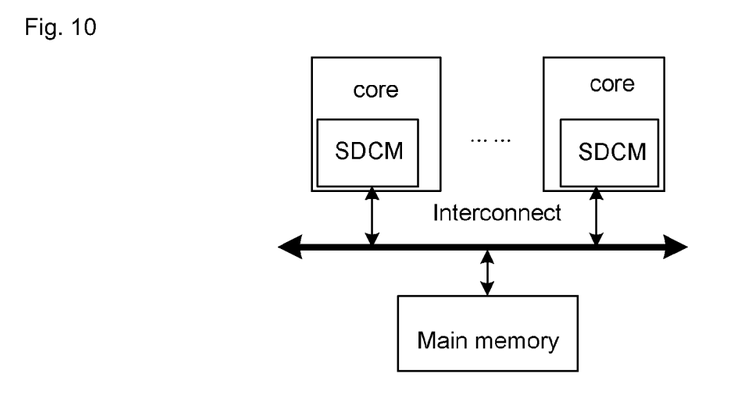
FIG. 10 shows a structural diagram of an intelligence cache according to eighth embodiment of the disclosure.
Figure 11:
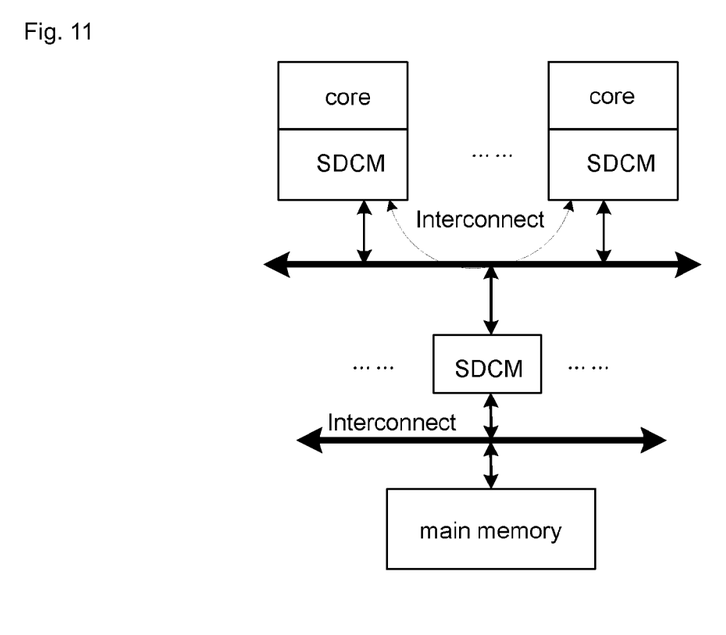
FIG. 11 shows a structural diagram of an intelligence cache according to ninth embodiment of the disclosure.

Indeed, the SDCM can also be a private memory of the core, or form a hierarchical memory structure. FIG. 10 shows a structural diagram of an intelligence cache according to an eighth embodiment of the disclosure, and FIG. 11 shows a structural diagram of an intelligence cache according to a ninth embodiments of the disclosure. As shown in FIGS. 10 and 11, SDCMs are used as private memories in the core or a hierarchical memory structure. The SDCMs can be connected as a Symmetrical Multiple Processor (SMP) structure as shown in FIG. 10 or an Asymmetric Multiple Processor (AMP) structure as shown in FIG. 11. Whether SMP or AMP, the coherence among SDCMs can be realized.

Those skilled in the art should understand that according to the requirements on application the SDCMs can be connected as many structures, even it is possible to add one or more SDCMs in the other current memory structures.

The disclosure further records an intelligence terminal including the intelligence cache above. The intelligence terminal includes a computer, a notebook, a cell phone, a personal digital assistant, a console or others having a CPU control unit, for example.

What explained above are only the preferred embodiments of the disclosure and not intended to limit the scope of protection of the disclosure.

INDUSTRIAL APPLICABILITY

The intelligence cache of the disclosure can process complex operations and disordered controls by a core only and submit a large amount of frequently used and simple data to the intelligence processing unit of the intelligence cache for processing. Furthermore, the data processing by the intelligence processing unit is not only related to individual data, but also to a whole specific data structure, so as to process data in proximity to memories as much as possible, thereby reducing the dependency on bus and the burden on core and achieving the balance among performance, power consumption, cost and the like.

The invention claimed is:

1. An intelligence cache, comprising: a general interface, a software define and reconfiguration unit, a control unit, a memory unit and an intelligence processing unit, wherein
    the general interface is configured to receive configuration information and/or control information, and/or data information from a core or a bus, and return target data;
    the software define and reconfiguration unit is configured to define a memory as a required cache memory according to the configuration information;
    the control unit is configured to control writing and reading of the cache memory and monitor instructions and data streams in real time, and control the memory unit to load the required data in advance according to system information, features of tasks to be executed and features of data structures used;
    the memory unit is composed of a number of memory modules and configured to cache data; and the required cache memory is formed by the memory modules according to the definition of the software define and reconfiguration unit; and
    the intelligence processing unit is configured to process input and output data, and transfer, convert and operate on data among multiple structures defined in the control unit;
    wherein the software define and reconfiguration unit is further configured to dynamically reconstruct idle memory modules in its operating process.

2. The intelligence cache according to claim 1, wherein the required cache memory can be configured as at least one of the following:
    Tightly Coupled Memory (TCM), Content Addressable Memory (CAM) and Cache.

3. The intelligence cache according to claim 1, wherein the general interface further comprises a coherent interface in a multi-core environment.

4. The intelligence cache according to claim 1, wherein the software define and reconfiguration unit is further configured to define cache memories with different properties and same structure, wherein the cache memories with different properties and same structure include at least one of the following: full associative cache, 16-way associative cache, 4-way associative cache, 2-way associative cache and direct-mapped cache.

5. The intelligence cache according to claim 1, wherein the intelligence processing unit transferring, converting and operating on data among multiple structures defined in the control unit comprises:
    matrix operation, bit level operation, data search, data sorting, data comparison, logic operation, setting/resetting, read-modify-write operations, and operations of increment, decrement, addition and subtraction.

6. The intelligence cache according to claim 1, wherein the intelligence processing unit is further configured to fill and update data and transfer data to a next-level memory.

7. The intelligence cache according to claim 1, wherein the control unit loads data according to the size of data blocks defined by the software define and reconfiguration unit or loads data automatically; and a dedicated memory area is defined in the memory unit to load abnormal or disordered control programs.

8. An intelligence terminal comprising the intelligence cache according to claim 1.

9. The intelligence terminal according to claim 8, comprising: a computer, a notebook, a cell phone, a personal digital assistant or a game machine.

10. The intelligence terminal according to claim 8, wherein the required cache memory can be configured as at least one of the following:
    Tightly Coupled Memory (TCM), Content Addressable Memory (CAM) and Cache.

11. The intelligence terminal according to claim 10, comprising: a computer, a notebook, a cell phone, a personal digital assistant or a game machine.

12. The intelligence terminal according to claim 8, wherein the general interface further comprises a coherent interface in a multi-core environment.

13. The intelligence terminal according to claim 12, comprising: a computer, a notebook, a cell phone, a personal digital assistant or a game machine.

14. The intelligence terminal according to claim 8, wherein the software define and reconfiguration unit is further configured to define cache memories with different properties and same structure, wherein the cache memories with different properties and same structure include at least one of the following: full associative cache, 16-way associative cache, 4-way associative cache, 2-way associative cache and direct-mapped cache.

15. The intelligence terminal according to claim 14, comprising: a computer, a notebook, a cell phone, a personal digital assistant or a game machine.

16. The intelligence terminal according to claim 8, wherein the software define and reconfiguration unit is further configured to dynamically reconstruct idle memory modules in the operating process.

17. The intelligence terminal according to claim 8, wherein the intelligence processing unit transferring, converting and operating on data among multiple structures defined in the control unit comprises:

matrix operation, bit level operation, data search, data sorting, data comparison, logic operation, setting/resetting, read-modify-write operations, and operations of increment, decrement, addition and subtraction.

18. The intelligence terminal according to claim 8, wherein the intelligence processing unit is further configured to fill and update data and transfer data to a next-level memory.

19. The intelligence terminal according to claim 8, wherein the control unit loads data according to the size of data blocks defined by the software define and reconfiguration unit or loads data automatically; and a dedicated memory area is defined in the memory unit to load abnormal or disordered control programs.

\* \* \* \* \*